United States Patent
Humphrey et al.

(10) Patent No.: US 7,922,077 B2
(45) Date of Patent: *Apr. 12, 2011

(54) SYSTEM AND METHOD FOR ACTIVATING TELEPHONE-BASED PAYMENT INSTRUMENT

(75) Inventors: Wendy Humphrey, Fort Lauderdale, FL (US); Sunil Dewan, Omaha, NE (US); Daniel J. Oswald, Papillion, NE (US)

(73) Assignee: First Data Corporation, Greenwood Village, CO (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/352,517

(22) Filed: Jan. 12, 2009

(65) Prior Publication Data

US 2009/0181644 A1    Jul. 16, 2009

Related U.S. Application Data

(63) Continuation of application No. 11/382,647, filed on May 10, 2006, now Pat. No. 7,562,813.

(51) Int. Cl.
 *G06F 17/60* (2006.01)
(52) U.S. Cl. ......................... 235/379; 235/380
(58) Field of Classification Search .................. 235/379, 235/380, 451, 375, 382, 383; 705/35, 44, 705/76; 455/558, 406; 902/4, 5
See application file for complete search history.

(56) References Cited

U.S. PATENT DOCUMENTS

| | | |
|---|---|---|
| 5,943,423 A | 8/1999 | Muftic |
| 6,078,806 A | 6/2000 | Heinonen et al. |
| 6,940,466 B2 | 9/2005 | Terry |
| 7,004,385 B1 | 2/2006 | Douglass |
| 7,194,438 B2 | 3/2007 | Sovio et al. |
| 7,562,813 B2 * | 7/2009 | Humphrey et al. ............ 235/379 |
| 2001/0027439 A1 | 10/2001 | Holtzman et al. |
| 2002/0116285 A1 | 8/2002 | Ito |
| 2002/0120582 A1 | 8/2002 | Elston et al. |
| 2002/0123965 A1 | 9/2002 | Phillips |
| 2003/0018532 A1 | 1/2003 | Dudek et al. |
| 2003/0191721 A1 | 10/2003 | Fiammante |
| 2004/0030601 A1 | 2/2004 | Pond et al. |
| 2004/0127256 A1 | 7/2004 | Goldthwaite et al. |
| 2005/0010525 A1 | 1/2005 | Ross et al. |

(Continued)

OTHER PUBLICATIONS

Harris, Christian, "Nokia's First NFC Product—Why It's Important", dated Nov. 4, 2004, obtained online at http://digital-lifestyles.info/display_page.asp?section=distribution&id=17433, 3 pages.

(Continued)

*Primary Examiner* — Daniel St.Cyr (74) *Attorney, Agent, or Firm* — Kilpatrick Townsend & Stockton LLP (57) ABSTRACT

A payment instrument in the form of a cell phone is loaded with account information and activated as a payment instrument by reading account information from a nearby RFID device, and entering a user PIN or password. In one embodiment, the account information is read from an RFID tag provided to the user, and the password is entered on the phone keypad. In a second embodiment, the account information is read from an RFID device at an ATM or kiosk after the user inserts a card into a card reader at the ATM or kiosk and enters the password at the ATM or kiosk keypad.

26 Claims, 6 Drawing Sheets

U.S. PATENT DOCUMENTS

| | | |
|---|---|---|
| 2005/0187873 A1 | 8/2005 | Labrou et al. |
| 2005/0211760 A1 | 9/2005 | Dewan et al. |
| 2005/0222961 A1 | 10/2005 | Staib et al. |
| 2007/0057038 A1 | 3/2007 | Gannon |

OTHER PUBLICATIONS

Nokia Communications, "Nokia Unveils the World's First NFC Product—Nokia NFC Shell for Nokia 3220 phone", obtained online at http://press.nokia.com/PR200411/966879_5.html, 2 pages dated Nov. 2, 2004.

O'Connor, Mary Catherine, "RFID Phone Payment Systems Good to Go", RFID Journal, dated Apr. 21, 2005, file://C:\Documents and Settings\sfj\Local Settings\Temporary Internet Files\OLK20E\R., 3 pages.

Ortiz, Jr., Sixto, "In Near-Field Communications Close to Success?", IEEE Computer Society: Computer Magazine, vol. 39, Issue 3, Mar. 2006, pp. 18-20.

Rae Saleem, "Preferred Payment Architecture: Local Payment", published by Mobey Forum, dated Sep. 2002, 48 pages.

* cited by examiner

SYSTEM AND METHOD FOR ACTIVATING TELEPHONE-BASED PAYMENT INSTRUMENT

CROSS-REFERENCES TO RELATED APPLICATIONS

This application is a Continuation of U.S. patent application. Ser. No. 11/382,647, filed May 10, 2006, and entitled "SYSTEM AND METHOD FOR ACTIVATING TELEPHONE-BASED PAYMENT INSTRUMENT", the entire contents of which is herein incorporated by this reference for all purpose

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Smart cards are used for conducting transactions, such as purchases at a retail locations, financial transactions at ATMs, fees at toll road pay booths, and the like. Some smart cards have contact-less interfaces and employ a variety of wireless technologies, including Bluetooth, infrared, and radio frequency such as RFID (radio frequency identification) technology. One form of RFID technology that has been recently used in smart cards is Near Field Communications (NFC), which permits exchange of data between an RFID device or "tag" and an RFID reader, when the tag and reader are touched or brought within several inches of each other. RFID devices employing NFC technology operate at a radio frequency range of 13.56 MHz, use very small amounts of power, and comply with published standards, including ISO (International Standards Organization) 18092, ISO 21481, ECMA (formerly European Computer Manufacturers Association) 340, 352 and 356, and ETSI (European Telecommunications Standards Institute) TS 102 190. When incorporated into contact-less smart cards, they are also compatible with commercially available smart card infrastructure based on ISO/IEC 14443, which includes devices and technology such as the Phillips MIFARE® smart card technology and the Sony® FeliCa Card.

Such technology has also been placed in wireless telephones, PDA's and similar devices, which can be used as payment instruments in lieu of card-like structures. This eliminates the need for a consumer to carry a separate smart card. Thus, the account data (for one or more card accounts) may be stored in and used from a single wireless device (e.g., cell phone) that is carried by the consumer.

Cell phones that employ RFID devices and that may be used as payment instruments have recently become available, such as the Nokia 3220 cell phone, which is described in the Nokia Press Release, "Nokia Unveils the World's first NFC product—Nokia NFC Shellfor Nokia 3220 Phone," dated Nov. 2, 2004 (available at www.press.nokia.com), Harris, C., Nokia's First NFC Product—Why It's Important, dated Nov. 4, 2004 (available at www.digital-lifestyles.info), and O'Connor, M., RFID Phone Payment Systems Good to Go, dated Apr. 25, 2005 (available at RFIDjournal.com).

Once loaded with the proper account information, a cell phone that is enabled as a payment instrument works like any other contact-less smart card. However, there are a limited number of methods used to initially load the necessary account information into the cell phone, and such methods are often not convenient for the consumer and are prone to privacy and security issues. For example, one method is providing a phone (or a "shell" or cover for a phone) to the consumer with the account information preloaded, and the customer thus needs to replace the cell phone (or cover) if there should be a change in smart card accounts. Another method of loading account information is to require the phone be taken to a specific, secure location where the phone can be connected to a terminal by a representative of the card issuer, and the account information downloaded (e.g., through a physical adaptor or through cabling). Neither of these approaches provide flexibility for a customer to have an account added (or changed) when the customer already has possession of a phone with RFID or similar functionality.

BRIEF SUMMARY OF THE INVENTION

Embodiments of the present invention provide methods and systems for activating a payment instrument (in the form of a mobile device, such as a telephone) by reading account information (an account identifier) from an external wireless device, loading the information into the phone, and entering an authentication code (such as a PIN), password, or biometric vector.

In some embodiments, activation is accomplished by loading account information into the telephone using an RFID device within the telephone and an external RFID device, and using the keypad of the telephone or a keypad of a self-service terminal (e.g., ATM) to enter the password.

In one embodiment, a method is provided for activating a payment instrument in the form of a mobile device, where the mobile device employs telecommunications signaling and has a payment instrument module that employs separate wireless signaling for storing and transmitting an account identifier. The method includes associating a personal identifier with the account identifier and providing that personal identifier to a user (cardholder) prior to activation of the payment instrument, placing the mobile device in proximity to an external wireless device, transmitting an account identifier from the external wireless device to the payment instrument module, requesting a personal identifier be provided by the user, and activating the payment instrument to use the transmitted account identifier if the requested personal identifier provided by the user matches the personal identifier associated with the account identifier.

A more complete understanding of the present invention may be derived by referring to the detailed description of the invention and to the claims, when considered in connection with the Figures.

DETAILED DESCRIPTION OF THE INVENTION

Figure 1:
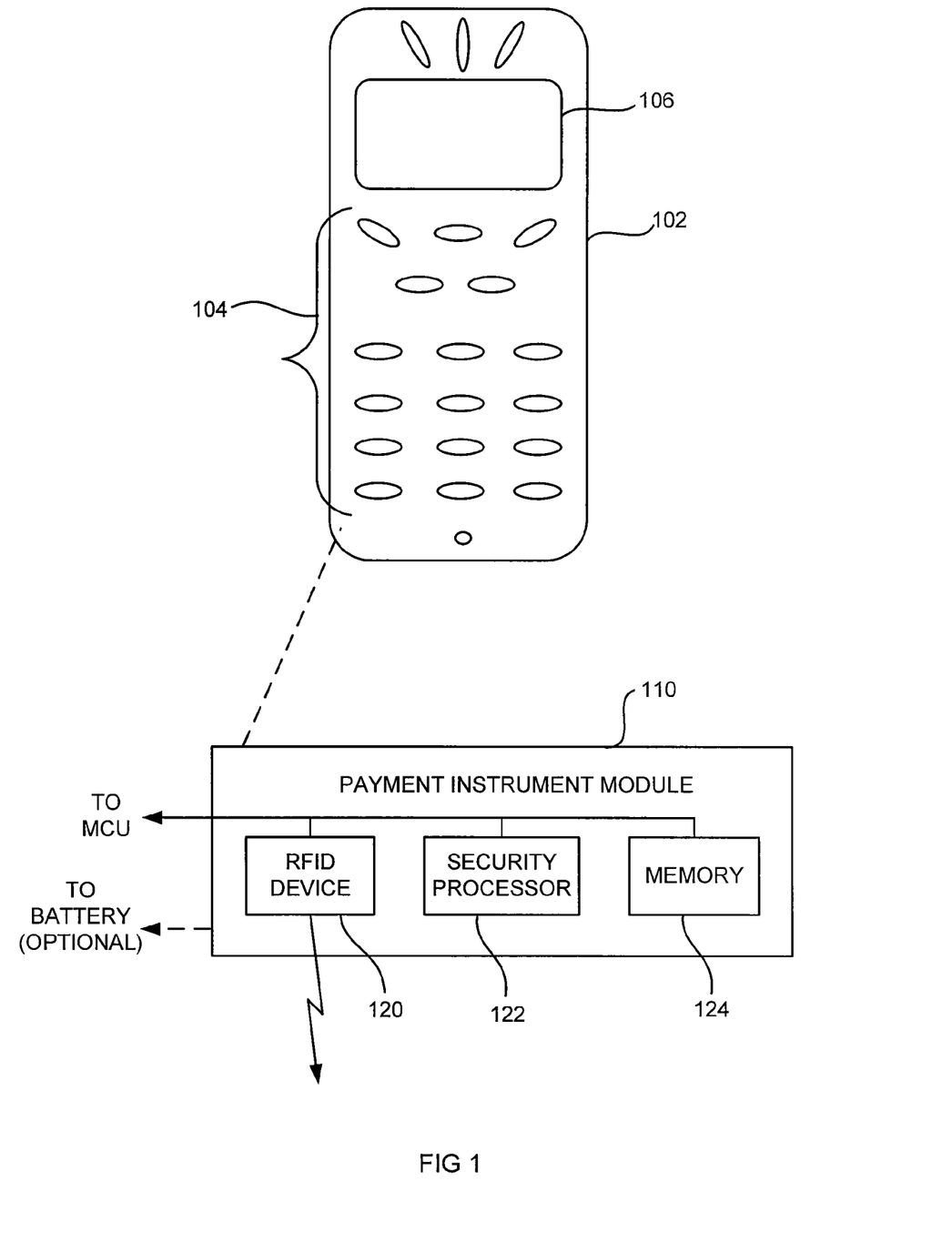
FIG. 1 illustrates a telephone-based payment instrument that may be activated in accordance with embodiments of the present invention.

There are various embodiments and configurations for activating payment instruments pursuant to the present invention. Further, payment instruments to be activated may take a number of different forms, one of which is shown in FIG. 1 as a mobile device or cell phone 102. The phone 102 functions both as a user communications device (for making telephone calls, and if web enabled, for sending emails, accessing internet websites, etc.), and also as a contact-less smart card, enabling the user to conduct transactions at POS (point-of-sale) terminals, ATMs, toll booths, and many other locations where financial transactions are conducted.

Wireless phones that serve as payment instruments are known, and descriptions can be found, for example, in U.S. Patent Application Publication No. 2004/0030601, filed by Russell L. Pond et al., which is hereby incorporated by reference.

As conventional, the phone 102 includes a keypad or keyboard 104 and a display 106. It also includes a payment instrument module (to be described later) that provides contact-less smart card (RFID) functionality to the phone so that the phone may be used as a payment instrument. Briefly, RFID features permit the presence of the phone to be detected when in proximity to an RFID reader at locations where transactions are to be made (e.g., a retail POS system). The cell phone sends account information (stored in the phone) using short range radio signaling in response to a request from the reader (the short range signaling complies with NFC protocols and standards as described earlier, and is separate from the wireless telecommunications signaling that the phone might otherwise use for normal voice and data communications). The account information and the transaction to be conducted may be verified by entering a user PIN, e.g., at the keyboard 104. Depending on the particular application and configuration, the display 106 of the phone may provide instructions to lead the user/customer through the transaction. Further details of exemplary uses for and configurations of the payment instrument/phone 102 can be found in previously referenced U.S. Patent Application Publication No. 2004/0030601.

While not shown in FIG. 1, but as conventional, the phone 102 has a master control unit (MCU) or processor that may be programmed to control the overall operation of the phone.

The functionality that enables the phone 102 to serve as a payment instrument is illustrated in FIG. 1 as a payment instrument module 110. The module 110 includes an RFID device 120 for transmitting and receiving short range radio signals, a security processor 122, and a memory 124. Depending on the application, the RFID device 120 may be either passive or active. If passive, it relies on the power from the radio signals of a nearby RFID reader. If active, it has a source of power, such as the battery of cell phone 102 (seen as an optional connection in FIG. 1), and may always be transmitting (or listening for) RFID signals. In other cases, device 120 may be a hybrid RFID device that is "asleep" (and draws no power) until either deliberately turned on (e.g., by pressing a designated key of the cell phone), or upon being placed in proximity to an RFID reader, which reader provides sufficient power through radio signals to "wakeup" the RFID device and thereafter cause it to be powered by its own source (e.g., the cell phone battery). The security processor 122 provides security and other processing for data transmitted or received by the RFID device, with security implemented by programmed code and logic that encrypts/decrypts data using well known encryption techniques. The processor 122 may also be programmed to carry out an activation process, e.g., by receiving account data through RFID device 120 and storing that data in memory 124, and authenticating the account data by verifying a user PIN, which will be described in greater detail below.

The payment instrument module 110 may be interconnected with the phone 102 in several different ways. For example, in some embodiments, the module 110 may be incorporated into a removable telephone cover that is attached and connects to the phone for communications signaling and for power. In other embodiments, the module 110 may be an RFID card that plugs into a card connector in phone 102, with the card including a subscriber identity module (SIM) that provides user identification and memory for storage of programming logic and data. In yet other embodiments, module 110 may be integrated into the internal circuitry of phone 102 and share functionality with at least some existing phone cell components.

As illustrated in FIG. 1, the payment instrument module 110 may also be connected to the MCU or main processor of the cell phone, and accordingly, in some embodiments, at least some of the functionality for accomplishing activation could be carried out by processing and memory devices within the cell phone 102, in addition to or in lieu of the programmed functions carried out by processor 122 and memory 124.

Figure 2:
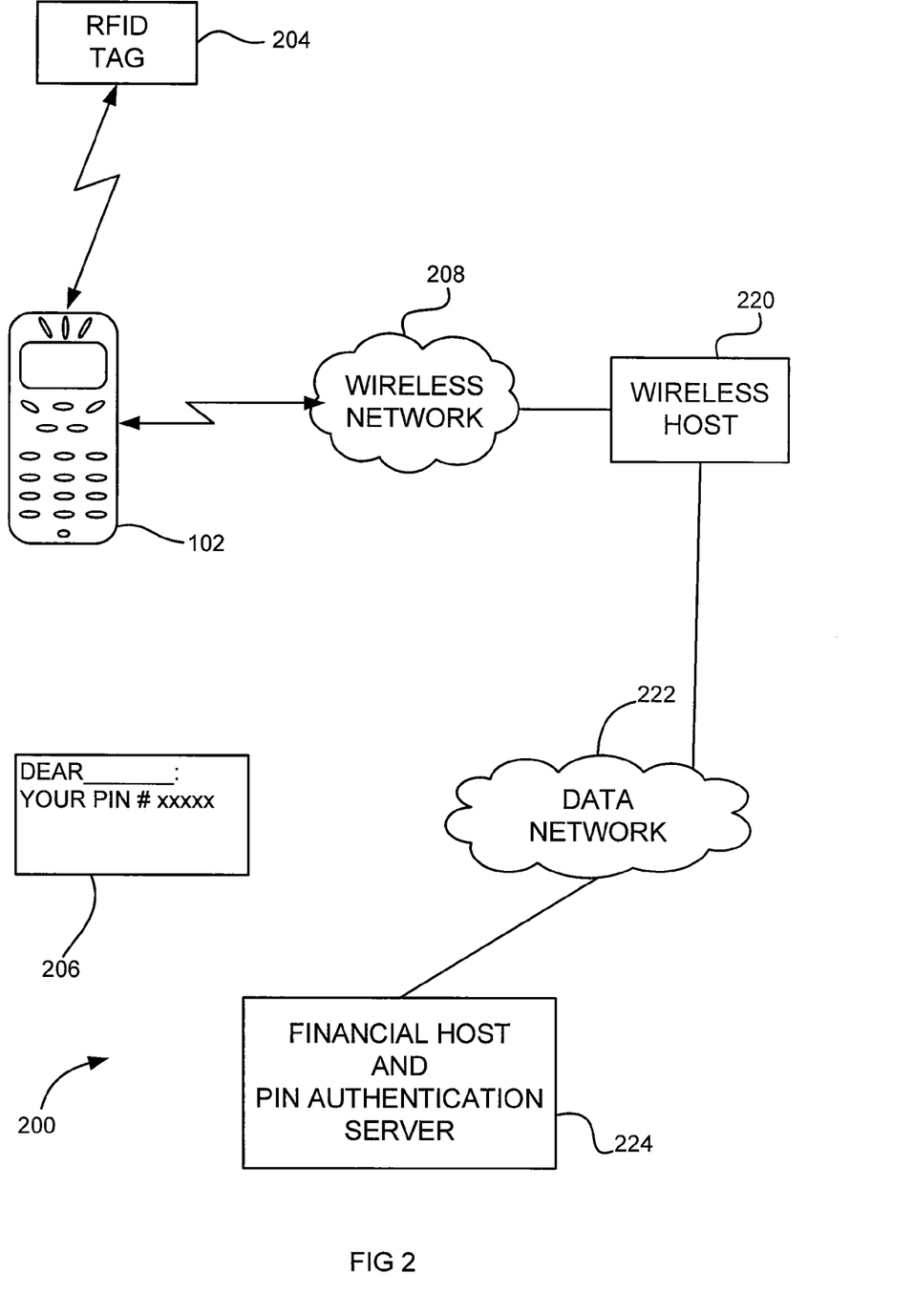
FIG. 2 illustrates one embodiment of a system for activating a telephone-based payment instrument, using an RFID tag and a PIN (personal identification number) that have both been mailed to the consumer.

Referring to FIG. 2, there is shown a system 200 for activating a cell phone-based payment instrument in accordance with one embodiment of the invention. The phone 102 is activated as a payment instrument through the use of an RFID tag 204 (in this embodiment, a passive RFID device) that is provided to the user and that includes account identifying data pertaining to the user (account number, user identification number, etc.), and a unique PIN that is also provided to the user, such as in a letter 206. In some embodiments it is desired for the RFID tag 204 and letter 206 to be provided separately for security purposes, to reduce the likelihood that an unauthorized person with access to the phone will be able to use it to steal account information or use it to conduct fraudulent transactions. For example, the RFID tag 204 and the letter 206 may be mailed separately and at different times. As another example, the RFID tag may be provided in person or through the mail as part of a promotional campaign, with stored data pertaining to a new, conditional account that may be set up for the user only upon acceptance of the RFID tag (and acceptance of terms and conditions associated with the new account). If the RFID tag is accepted (e.g., through a telephone call to a financial institution), the PIN is separately mailed to the user.

A process representing one embodiment for activating the phone in the system 200 of FIG. 2 will be described later in conjunction with FIGS. 4A and 4b. Briefly, the RFID device 120 (in this embodiment, either an active or "hybrid" RFID device) in phone 102 reads the user account data from RFID tag 204 when the user "waives" or places the phone at or near the RFID tag 204. The user then enters at the phone keyboard the PIN provided in letter 206, and if it correctly matches the PIN associated with the account, the user is authenticated and the account data in the cell phone may be used thereafter to conduct transactions. As part of the authentication process, the PIN entered by the user is transmitted through a wireless telecommunications network 208 (e.g., the network operated by a telecommunications carrier providing phone service to the user) to a wireless host 220, which in turn routes the PIN over a network 222 (e.g., a public network such as the internet) to a financial host 224, where the user's account is maintained, and where a record of the PIN assigned to the user is stored (the host 224 includes a PIN authentication server). If the entered PIN is a correct match, the financial host 224 returns an acceptance message (through data network 222, wireless host 220 and wireless network 208) to the phone, and the payment instrument is activated.

Figure 3:
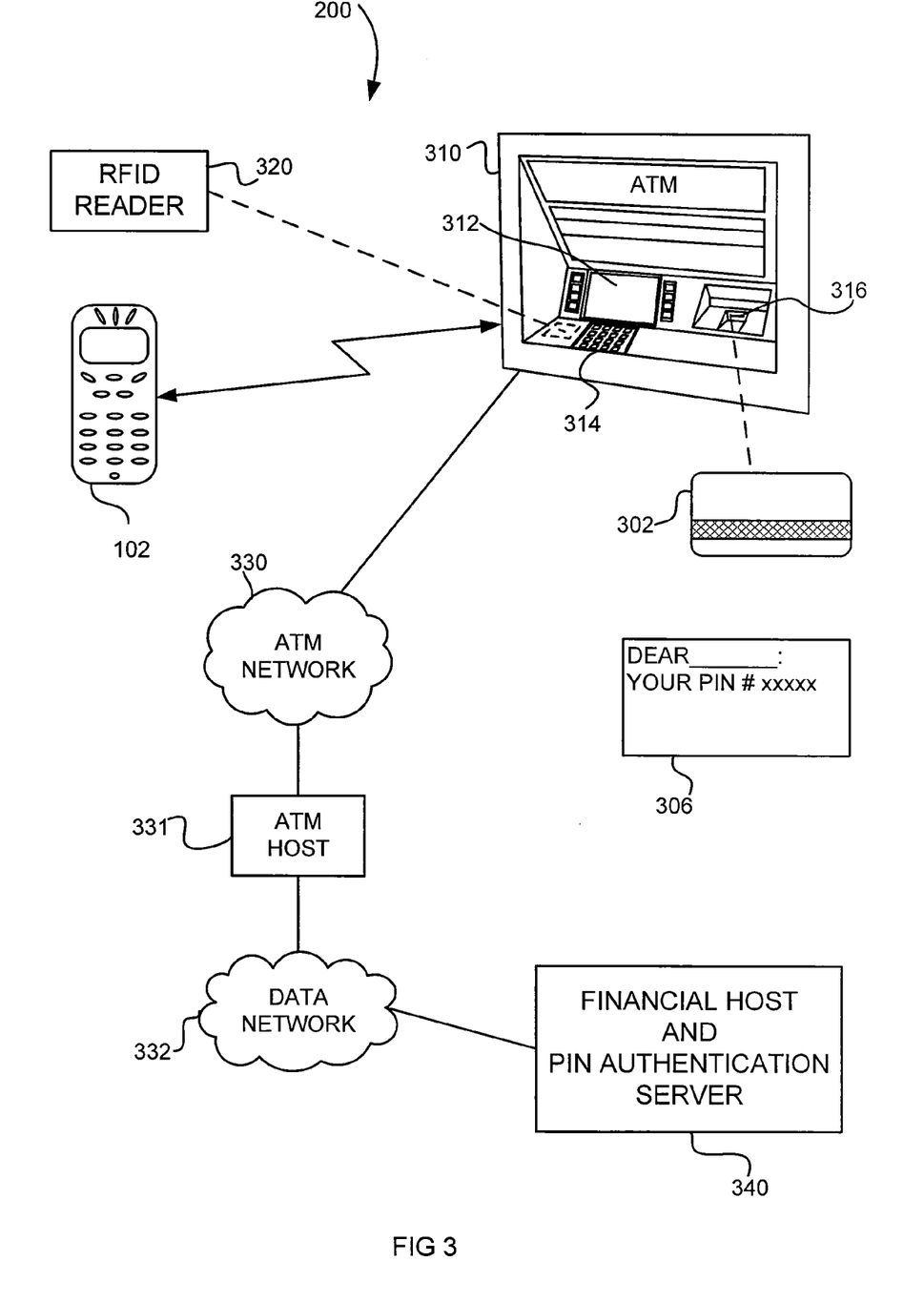
FIG. 3 illustrates an alternative embodiment, using an ATM for activating a telephone-based payment instrument.

FIG. 3 illustrates a system 300 for activating a cell phone-based payment instrument in accordance with another embodiment of the invention, where a user having a phone with smart card capability is provided a magnetic stripe card 302 and a letter 306 with a PIN. The card stores (on the magnetic stripe) account identifying information, relating to a new account or an existing account of the user. The user takes the card 302 and the phone 102 to a conveniently located ATM 310, kiosk or similar self-service terminal. The ATM 310 has a display 312, a keyboard 314, a card reader 316, and an RFID reader 320. The ATM communicates through an ATM network 330 to an ATM host 331, and over a data network 332 to a financial host 340 that maintains account information for the user.

A process representing one embodiment for activating the phone in the system 300 of FIG. 3 will be described later in conjunction with FIGS. 5A and 5B. Briefly, account identifying data is read from the card 302, and the user is instructed (e.g., at display 312) on steps for activating the payment instrument, including placing the phone near the RFID reader 320 at the ATM, which then senses the presence of the phone. In some embodiments, the card 302 may also store the PIN, so that the user is authenticated at the ATM immediately after inserting the card and entering the PIN. The account information on the card is then encoded into the phone and it is ready for use as a payment instrument.

In other embodiments, the account data on the card 302 is used to access records within financial host 340, including a record of the correct PIN for the user. If the PIN entered at the keyboard 314 of ATM 310 matches a PIN associated with the account at host 340, an acceptance (authenticating) message is transmitted to the ATM 310 which causes the account information read from card 302 to be loaded from reader 320 into memory 124 of the phone, in order to activate the payment instrument feature of the phone. If desired, additional account information from host 340 may also be loaded into the phone (e.g., additional accounts, PINs to be used in subsequent transactions, account balances, etc.).

Also, while the disclosed embodiments envision the activation process being carried out with the card 302 being issued solely for the purpose of activating the phone, it should be appreciated that a cardholder's existing ATM card (having the appropriate account information already encoded) could be used, e.g., in response to the cardholder receiving a promotional letter from the financial institution/card processing entity, informing the cardholders that his/her phone can be activated as a payment instrument and encouraging the cardholder to visit an ATM (with the existing ATM card) in order to activate the phone.

Figure 4A:
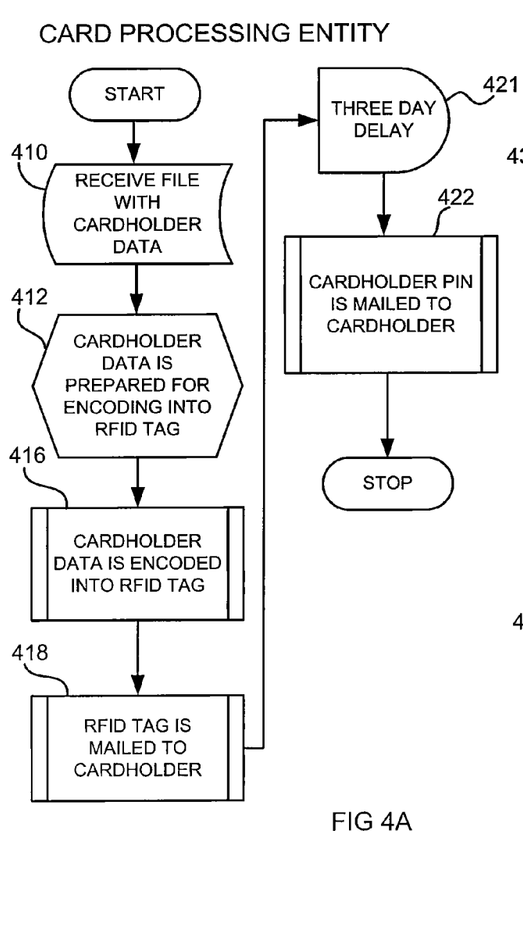
FIGS. 4A and 4B are flow diagrams illustrating an activation process used in connection with the system of FIG. 2.
Figure 4B:
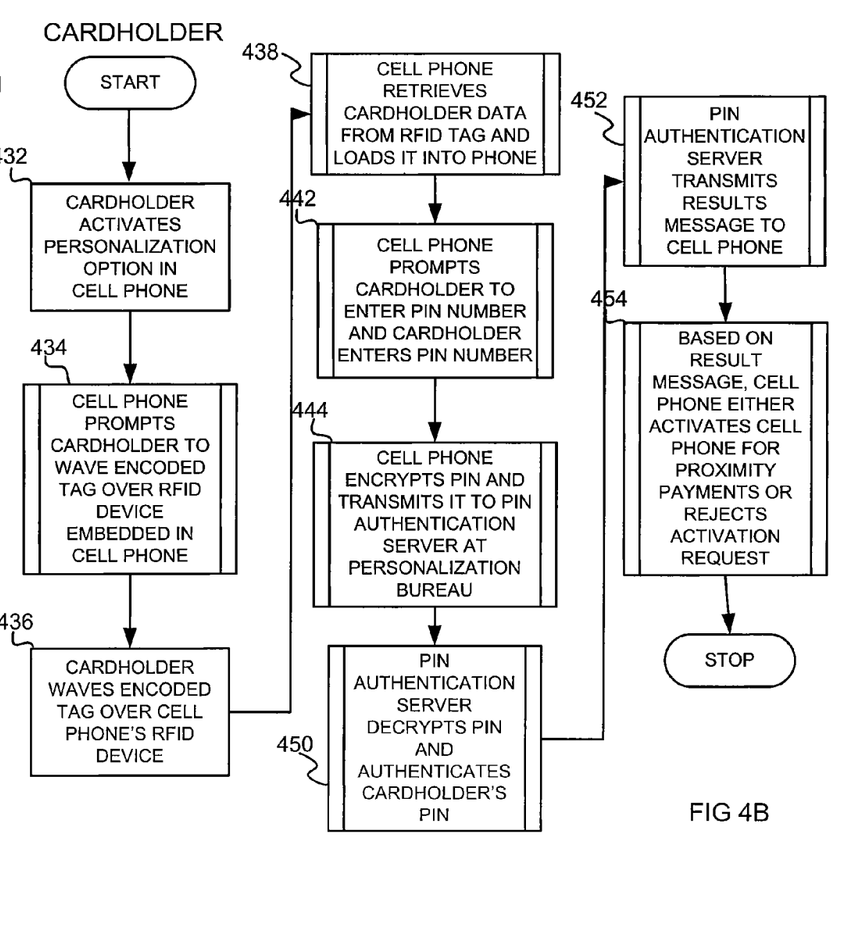

FIGS. 4A and 4B illustrate in greater detail a process for activating a payment instrument using the system 200 described above in conjunction with FIG. 2, and so the described process will make reference to FIG. 2 as well as FIGS. 4A and 4B. For purposes of describing the process, it is assumed (without limiting the scope of the invention) that the account to be associated with the activated presentation instrument is a credit card account, and that the processing of transactions using the account, and the issuance and activation of payment instruments, are all managed by a card processing entity. It is further assumed that the account is an existing account, and that the phone based-payment instrument will be activated only for that single account. However, it should be appreciated that a phone-based payment instrument may be used in connection with multiple and different kinds of financial accounts, including (but not limited to) credit card accounts, debit card accounts, stored value card accounts and the like. Also, a phone-based payment instrument may be activated for a new account for which an account holder has not previously had a physical card or other traditional payment instrument. In addition, there may be multiple cardholders (e.g., members of a family) using a single account, and while some cardholders may have wireless phones that may be activated as a payment instruments, others using that account may have traditional cards.

Turning to FIG. 4A, when the process is to be initiated, the card processing entity receives a file with cardholder data that is to be used in activating the payment instrument (step 410). The cardholder data may include many different kinds of cardholder information (such as cardholder name, address, account number, credit limits and so forth). Only certain kinds of data are required to identify the account for purposes of activation (e.g., an account ID and/or an account holder ID), and that data is extracted from the file in preparation for encoding an RFID tag 204 (step 412). The tag itself is then encoded by the card processing entity with the account identifying data (step 416). One of many encoding techniques can be used, such as asymmetric or Diffie-Hellman techniques. The RFID tag is then mailed to the cardholder (step 418). A PIN associated with the account is then created and separately mailed (via letter 206) by the card processing entity to the cardholder (step 422). This PIN may be a one-time PIN used only for purposes of activating the payment instrument, or if desired, it may be a PIN that will also subsequently be used by the cardholder for conducting transactions after the payment instrument has been authenticated. A record of the PIN is retained in the financial host 224 by the processing entity for subsequent verification, as will be described shortly. In addition, for added security and as illustrated in FIG. 4A, a delay 421 (e.g., 3 days) may be created between mailing the RFID tag and then mailing the PIN.

After receiving the tag and PIN, the cardholder is ready to complete the activation process as illustrated in FIG. 4B. The cardholder first selects (from menu options displayed on the phone 102) a card activation option (step 432), and the phone display then prompts the cardholder to "waive" the phone over the tag (step 434). When the phone is brought into close proximity to the tag (step 436), the RFID device in the phone retrieves the cardholder data stored in the tag and loads it into the memory 124 of the phone, step 438. The programmed logic within the payment instrument module 110 does not permit access to the account data, however, until the user has been authenticated.

Figure 6:
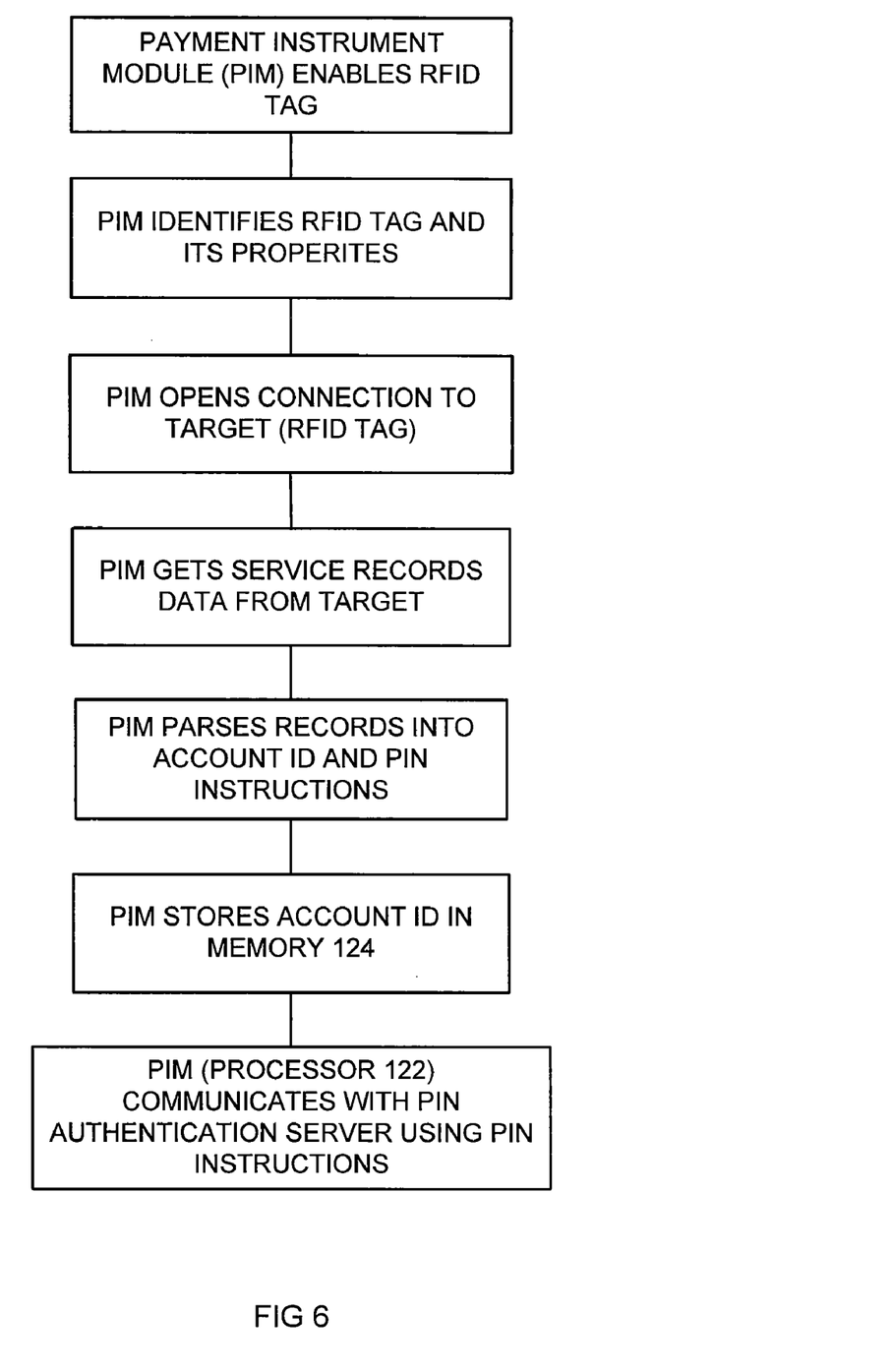
FIG. 6 is a flow diagram illustrating program steps carried out by the payment instrument module in activating the telephone-based payment instrument.

FIG. 6 illustrates a series of programming steps for the communications between the payment instrument module 110 and the RFID tag 204, in order for the payment instrument module 110 to receive the cardholder data (and data/instructions for communicating with the PIN authentication server at host 224). Such programming steps may be implemented using a contact-less communications application program interface at both the module 110 and tag 204 in accordance with NFC or other payment instrument communications standards. The programming can use Java-based code, implementing, as an example, JINI, a well known standard distributed networking technology that is Java-based and originally developed by Sun Microsystems, and described at www.jini.org.

The details of the programming steps seen in FIG. 6 will not be described further, since they are evident from such figure. However, it should be noted that in the case of the embodiment of FIGS. 2, 4A and 4B, the RFID tag may provide a service record to the payment instrument module that not only includes the account ID (to be loaded into the phone 102) but also instructions and data (PIN instructions) to enable the phone to contact the host 224 (e.g., dialing instructions for establishing a telecommunication path or connection in the wireless network 202, wireless host 220 and data network 222).

Returning to FIG. 4B, the phone display prompts the cardholder to enter the PIN at the phone keyboard (step 442). At step 444, the PIN is encrypted (e.g., either by security processor 122 or by the master control unit within the phone), and sent over the wireless telecommunications network 208 to the financial host 224, which includes a PIN authentication server for decrypting and then authenticating the PIN (step 450) by comparing the transmitted PIN to the PIN originally stored as a record at the host 224. A message from the PIN authentication server (within host 224) is sent back to the cell phone through network 208 (step 452), and the security processor 122 (at step 454) either activates (enables) the cell phone as a payment instrument if a correct PIN has been entered or rejects the activation request (disables the payment instrument) if the entered PIN is not correct. If the cell phone is activated as a payment instrument, the security processor 122 thereafter permits the account data stored in memory 124 to be provided by the RFID device 120 (within the payment instrument module 110) to RFID proximity readers when a transaction is to be conducted.

It should be appreciated that the process illustrated in FIGS. 4A and 4B may be implemented (e.g., as to data capture and display of information at the phone) by software elements or programming logic stored and executed in phone 102 (e.g., either in security processor 122 or in the phone's master control unit/processor). Also, the process may be implemented (e.g., as to PIN authentication) by software elements or programming logic stored and executed at the financial host 224.

Figure 5A:
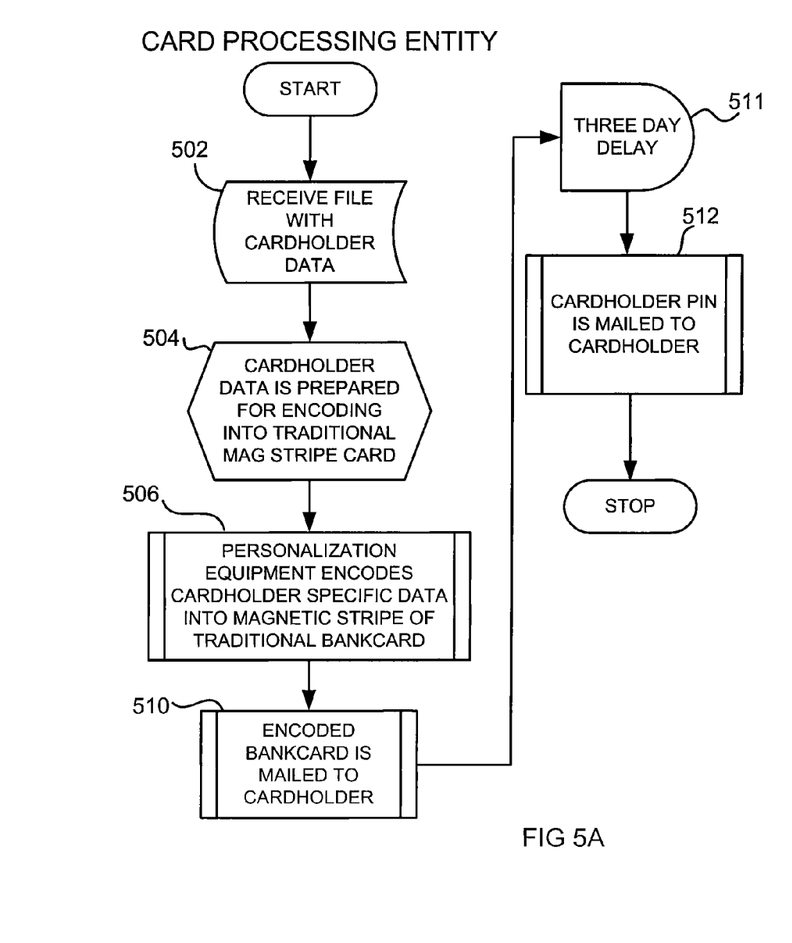
FIGS. 5A and 5B are flow diagrams illustrating an activation process used in connection with the system of FIG. 3.
Figure 5B:
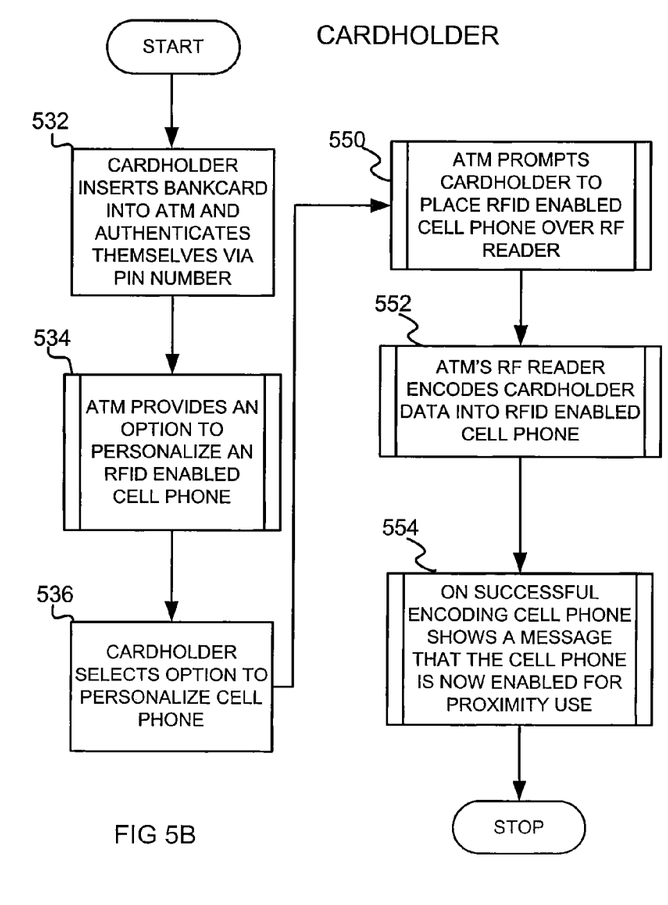

FIGS. 5A and 5B illustrate in greater detail a process for activating a payment instrument using the system 300 described above in conjunction with FIG. 3. However, rather than loading cardholder account identifying data into an RFID tag, data is loaded (encoded) onto the magnetic stripe of the card 302 (FIG. 3). Thus, in FIG. 5A, the card processing entity receives the cardholder data file, prepares it for encoding onto the magnetic stripe, and then uses personalization equipment to encode the card (steps 502, 504, 506). The card is mailed to the cardholder (step 510), and after a three day delay (step 511), the processing entity separately mails the PIN (step 512). Of course, any length of delay in mailing the PIN could be chosen (as appropriate to suit the needs of the processing entity).

When the cardholder is ready to complete activation (FIG. 5B), he/she visits an ATM (locations could be provided in the letter 306 along with the PIN). At step 532 the cardholder inserts the card into the card reader at the ATM 310 and also enters the provided PIN in order to authenticate himself/herself. It is contemplated that the card 302 has the PIN encoded thereon so that authentication occurs immediately at this point (by comparing the entered PIN with the PIN stored on the card), although it should be appreciated that the entered PIN could be sent to the financial host 340 for such purpose. Although not shown in FIG. 5B, if the cardholder does not enter the correct PIN, the cardholder is not permitted to proceed further in the process.

If authenticated, the cardholder then selects a payment instrument activation option provided at the display of the ATM (steps 534, 536).

The ATM display then instructs the cardholder to place the phone near the RFID reader 320 at the ATM (step 550). The RFID reader 320 then encodes the cardholder data into the payment instrument module 110 of the cell phone (step 552). After successful encoding, the cell phone displays a message to the cardholder that the phone has been activated and is now ready for use as a payment instrument (step 554)

While a detailed description of presently preferred embodiments of the invention have been given above, various alternatives, modifications, and equivalents will be apparent to those skilled in the art without varying from the spirit of the invention. For example, while the payment instrument is illustrated as a cell phone, any mobile device carried by the cardholder could be used (e.g., PDA, laptop computer, etc.). Furthermore, the PIN used for authenticating the user need not be a number, but rather could be a password or any string of characters that can be conveniently provided to the user for entry at the keyboard of the cell phone or ATM. In fact, the PIN might not even be a string of characters. Rather, among other things, the ATM 310 could be configured and programmed to use biometric measurements or vectors (signature or fingerprint recognition, retina scans, etc.) or any other form of personal user identification and authentication.

Also, while the illustrated embodiments use RFID device using NFC protocols and standards, many other forms of wireless signaling could be used to encode the payment instrument (bluetooth, infra red, longer range RFID signaling, etc.).

Therefore, the above description should not be taken as limiting the scope of the invention, but rather the scope is defined by the appended claims.

What is claimed is:

1. A method for activating a payment instrument in the form of a mobile device, wherein during activation an account identifier is loaded into the mobile device, and wherein the mobile device employs telecommunications signaling and has a payment instrument module that employs wireless signaling separate from the telecommunications signaling for storing the account identifier and for transmitting the account identifier when conducting a transaction, the method comprising:

associating a personal identifier with the account identifier and providing that personal identifier to a user prior to activation of the payment instrument;

placing the mobile device in proximity to, and without physical contact with, an external wireless device that is external to the mobile device, the external wireless device for transmitting wireless signaling representing the account identifier;

wirelessly transmitting the account identifier from the external wireless device to the payment instrument module, without the mobile device and external wireless device being in physical contact;

requesting a personal identifier be provided by the user; and enabling the payment instrument to use the transmitted account identifier if the requested personal identifier provided by the user matches the personal identifier associated with the account identifier.

2. The method of claim 1, wherein the personal identifier is requested from the user prior to transmitting the account identifier from the external wireless device.

3. The method of claim 1, wherein the personal identifier is requested from the user after transmitting the account identifier from the external wireless device.

4. The method of claim 1, wherein the payment instrument module and the external wireless device each include an RFID device.

5. The method of claim 4, wherein the RFID device in the payment instrument module and in the external wireless device employs near field communications (NFC).

6. The method of claim 1, wherein the mobile device is a wireless telephone.

7. The method of claim 6, wherein the external wireless device is a passive RFID tag.

8. The method of claim 7, wherein the RFID tag is provided to the user prior to activation.

9. The method of claim 8, wherein the RFID tag is mailed to the user.

10. The method of claim 9, wherein the telephone includes a keypad, and where in the user initiates the activation by using a key on the keypad.

11. The method of claim 10, wherein the personal identifier associated with the account identifier is a personal identification number (PIN) provided to the user separately from the RFID tag.

12. The method of claim 11, wherein the PIN associated with the account identifier is mailed to the user separately from the RFID tag.

13. The method of claim 11, wherein the PIN associated with the account identifier is provided to the user with instructions for activating the payment instrument, wherein the consumer in accordance with such instructions places the wireless device in close proximity to the RFID tag, and wherein the user receives further instructions on the display of the telephone, including an instruction to enter the PIN at the keyboard.

14. A method for activating a payment instrument in the form of a mobile device, wherein during activation an account identifier is loaded into the mobile device, and wherein the mobile device employs telecommunications signaling and has a payment instrument module that employs wireless signaling separate from the telecommunications signaling for storing the account identifier and for transmitting the account identifier when conducting a transaction, the method comprising:
associating a personal identifier with the account identifier and providing that personal identifier to a user prior to activation of the payment instrument;
placing the mobile device in proximity to an external wireless device that is at a publicly accessible terminal and is external to the mobile device, and wherein the external wireless device is for transmitting wireless signaling representing the account identifier;
wirelessly transmitting the account identifier from the external wireless device to the payment instrument module, without physical contact between the external wireless device and the mobile device;
requesting a personal identifier be provided by the user; and
enabling the payment instrument to use the transmitted account identifier if the requested personal identifier provided by the user matches the personal identifier associated with the account identifier.

15. The method of claim 14, wherein the external wireless device is an active or hybrid RFID device.

16. The method of claim 15, wherein the terminal is a self-service terminal.

17. The method of claim 16, wherein the self-service terminal is an ATM.

18. The method of claim 17, wherein the user receives a card for use in activating the payment instrument, the card including the account identifier.

19. The method of claim 18, wherein the account identifier is stored on a magnetic stripe on the card.

20. The method of claim 19, wherein the card is inserted into a card reader at the ATM in order to initiate the activation of the payment instrument.

21. The method of claim 20, wherein the requested PIN is provided by the user at a keyboard at the ATM.

22. The method of claim 1, wherein the account identifier includes data identifying either the user or an account of the user.

23. A system for activating an payment instrument in the form of an RFID enabled telephone, wherein during activation an account identifier is loaded into the telephone, the activated telephone including an RFID device for storing and transmitting the account identifier when conducting a transaction, the system including:
a PIN associated with the account identifier;
an external RFID device located at a self-service terminal for wirelessly transmitting the account identifier from the self-service terminal to the telephone, without physical contact and engagement between the external RFID device and the telephone; and
a programmed processor for instructing a user to enter a PIN at a keypad associated with either the external device or the telephone, and activating the payment instrument if the PIN entered at the keypad matches the PIN associated with the account identifier.

24. The system of claim 23, wherein the external RFID device is an active or hybrid RFID device at the self-service terminal, wherein the self-service terminal includes a display and a keypad, and wherein the programmed processor instructs the user at the display to enter a PIN on the keypad of the self-service terminal.

25. The system of claim 23, wherein the self-service terminal is an ATM.

26. The system of claim 25, wherein the user is provided a card having the account identifier stored thereon, and wherein the user provides the card to a card reader at the ATM in order to initiate the activation of the payment instrument.

\* \* \* \* \*